US009026924B2

(12) United States Patent
Maynard et al.

(10) Patent No.: US 9,026,924 B2
(45) Date of Patent: May 5, 2015

(54) DEVICES, SYSTEMS, AND METHODS FOR MOVING ELECTRONIC WINDOWS BETWEEN DISPLAYS

(71) Applicant: Lenovo (Singapore) Pte. Ltd., New Tech Park (SG)

(72) Inventors: Derek Linville Maynard, Yamagata (JP); Hidetoshi Mori, Yamato (JP)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 281 days.

(21) Appl. No.: 13/645,858

(22) Filed: Oct. 5, 2012

(65) Prior Publication Data

US 2014/0101574 A1     Apr. 10, 2014

(51) Int. Cl.
*G06F 3/14* (2006.01)
*G06F 3/0484* (2013.01)
*G06F 3/0485* (2013.01)

(52) U.S. Cl.
CPC ............ *G06F 3/1423* (2013.01); *G06F 3/0484* (2013.01); *G06F 3/0485* (2013.01)

(58) Field of Classification Search
USPC ................................. 715/761, 717; 348/383
See application file for complete search history.

(56) References Cited

U.S. PATENT DOCUMENTS

| | | | | |
|---|---|---|---|---|
| 6,522,309 | B1 * | 2/2003 | Weber | 345/1.1 |
| 6,573,913 | B1 * | 6/2003 | Butler et al. | 715/761 |
| 7,568,005 | B2 * | 7/2009 | Nichols et al. | 709/204 |
| 7,629,945 | B2 * | 12/2009 | Baudisch | 345/1.3 |
| 8,352,879 | B2 * | 1/2013 | Leung et al. | 715/799 |
| 2005/0015731 | A1 | 1/2005 | Mak et al. | |
| 2006/0038741 | A1 | 2/2006 | Mori et al. | |
| 2007/0150924 | A1 | 6/2007 | Ichinose et al. | |
| 2009/0150779 | A1 | 6/2009 | Kodama et al. | |
| 2009/0309808 | A1 * | 12/2009 | Swingler | 345/1.3 |
| 2010/0053164 | A1 * | 3/2010 | Imai et al. | 345/427 |
| 2010/0177016 | A1 * | 7/2010 | Zeng | 345/1.1 |
| 2012/0117495 | A1 * | 5/2012 | Sirpal et al. | 715/761 |
| 2013/0205237 | A1 * | 8/2013 | Nancke-Krogh | 715/765 |
| 2013/0283193 | A1 * | 10/2013 | Griffin, Timothy | 715/761 |

OTHER PUBLICATIONS

Thurott, Paul. "Windows 7 Feature Focus: Aero Peek," Oct. 6, 2010. Avialable at: http://winsupersite.com/windows-7/windows-7-feature-focus-aero-peek, last accessed Aug. 27, 2014.*
Kai Li , et al., Building and Using A Scalable Display Wall System, IEEE Computer Graphics and Applications, v.20 n.4, p. 29-37, Jul. 2000.*
[No Author Listed], "Dual monitor setup: Two monitors are better than one," Microsoft, dated 2012, retrieved Jul. 13, 2012 from <http://www.microsoft.com/athome/organization/twomonitors.aspx> .
U.S. Appl. No. 13/298,668, filed Nov. 17, 2011.

* cited by examiner

*Primary Examiner* — Doon Chow
*Assistant Examiner* — James T Tsai
(74) *Attorney, Agent, or Firm* — Nutter McClennen & Fish LLP; John J. Penny, Jr.; Megan E. Jeans

(57) ABSTRACT

Methods, systems, and devices are provided for moving electronic windows between multiple electronic displays. In one exemplary embodiment, a plurality of displays can each be configured to display a portion of a desktop. A duplicate can be created of a window displayed on a first one of the displays. In response to an instruction to move the window from the first one of the displays to a second one of the displays, the duplicate can be programmatically moved on the second one of the displays in unison with movement of the window on the first one of the displays.

17 Claims, 5 Drawing Sheets

DEVICES, SYSTEMS, AND METHODS FOR MOVING ELECTRONIC WINDOWS BETWEEN DISPLAYS

FIELD OF THE INVENTION

The present invention relates generally to devices, systems, and methods for moving electronic windows between displays.

BACKGROUND OF THE INVENTION

Traditional computer systems include a single display, e.g., a single screen. The display can display data to a user via a desktop, e.g., a graphical user interface (GUI) upon which objects (e.g., windows, computer icons, etc.) can be placed. Computer systems have been developed that include multiple displays, e.g., multiple screens, which can each display a portion of a desktop such that a single desktop can be displayed over multiple displays. The desktop can thus often be larger than available with a single display, which can allow for visualization of a greater amount of data and/or provide a better user experience by allowing a user to better organize data across the multiple displays, e.g., arrange one type of a data on a first one of the displays, arrange a second type of data on a second one of the displays, etc. Data can be organized by moving windows between different ones of the displays. A window displayed on the desktop can be moved between portions of the desktop, e.g., between displays, in any number of ways, as will be appreciated by a person skilled in the art, such as by user manipulation of a touch screen to drag and drop the window, a user dragging and dropping the window using an input/output device (e.g., a mouse, a stylus, a touchpad, etc.), user-input keyboard instruction, etc.

In a conventional computer system including multiple displays, one of the displays is designated as a primary display, while the other display(s) are designated as secondary display(s). The primary display is the display with which a user first and primarily interacts, e.g., logs onto, sets and changes system settings on, etc. Traditionally, a computer system considers the primary display as being physically located to the left of a secondary display. Thus, moving a window displayed on the primary display toward the right in a logical direction physically toward the secondary display moves the window to the secondary display. However, in some instances, a primary display may actually be physically located to the right of the secondary display due to, e.g., office space considerations, a physical desk setup, electrical outlet proximity, user preference, etc. If the primary display is actually physically located to the right of the secondary display, when a user moves a window displayed on the primary display toward the left in a direction physically toward the secondary display, the window will not move to the secondary display because the secondary display is presumed to not be in the left direction in which the window is moving. Moving the window in the left direction is intuitive to a user because of the physical locations of the primary and secondary displays. Yet, the user is forced to move the window in a counter-intuitive, right direction in order to move the window off the primary display and onto the secondary display, thereby providing a frustrating and counter-intuitive user experience.

Accordingly, there remains a need for improved devices and methods for moving windows or other user interface objects back and forth between displays.

SUMMARY OF THE INVENTION

In one embodiment, a system is provided that includes a first display device configured to display a first portion of a desktop, a second display device configured to display a second portion of the desktop, and a processor. The processor is configured to operatively connect to the first display device and the second display device, create a duplicate of a window displayed on the first portion of the desktop, and display on the second portion of the desktop a partial portion of the duplicate that corresponds to a partial portion of the window displayed on the first portion of the desktop that has been moved off the first portion of the desktop in response to an instruction to move the window from the first portion of the desktop to the second portion of the desktop. The duplicate can include at least one of an outline of the window and a snapshot view of contents of the window.

The processor can be configured to create the duplicate in response to the window being displayed on the first portion of the desktop prior to the instruction to move the window from the first portion of the desktop to the second portion of the desktop, the processor can be configured to create the duplicate in response to the instruction to move the window from the first portion of the desktop to the second portion of the desktop, or the processor can be configured to create the duplicate in response to the window being displayed on the first portion of the desktop in a forefront thereof.

The processor can vary in any number of ways. For example, the processor can be configured to display on the second portion of the desktop an entirety of the duplicate in response to an entirety of the window displayed on the first portion of the desktop having been moved off the first portion of the desktop in response to the instruction to move the window from the first portion of the desktop to the second portion of the desktop. For another example, the processor can be configured to move the duplicate or a portion thereof displayed on the second portion of the desktop in unison with movement of the window or a portion thereof displayed on the first portion of the desktop. For yet another example, in response to a second instruction to move the duplicate displayed on the second portion of the desktop from the second portion of the desktop to the first portion of the desktop, the processor can be configured to display on the first portion of the desktop a partial portion of the window that corresponds to a partial portion of the duplicate displayed on the second portion of the desktop that has been moved off the second portion of the desktop. For another example, in response to a pointer moving the window from the first portion of the desktop to the second portion of the desktop crossing over to the second portion of the desktop, the processor can be configured to cause a second partial portion of the duplicate to be displayed on the first portion of the desktop, cause a second partial portion of the window to be displayed on the second portion of the desktop, and, in response to an instruction to manipulate data in the second partial portion of the duplicate displayed on the first portion of the desktop, cause the partial portion of the window to be displayed on the first portion of the desktop and cause the partial portion of the duplicate to be displayed on the second portion of the desktop to allow manipulation of the window on the first portion of the desktop. For yet another example, the processor can be configured to cause the duplicate to be displayed on the first portion of the desktop in an invisible state. The processor can be configured to cause the duplicate to be displayed on the first portion of the desktop in the invisible state prior to any portion of the duplicate being displayed on the second portion of the desktop. The processor can be configured to make the duplicate visible on the first portion of the desktop and display the partial portion of the duplicate on the second portion of the desktop in response to the instruction to move the window from the first portion of the desktop to the second portion of the desktop.

Various edges of the first and second portions of the desktop can be programmatically connected. At least two of a left edge of the first portion of the desktop can be programmatically connected with a right edge of the second portion of the desktop such that in response to the first partial portion of the window being moved off the left edge of the first portion of the desktop, the processor can cause a corresponding portion of the duplicate to be moved onto the second portion of the desktop from the right edge of the second portion of the desktop; a right edge of the first portion of the desktop can be programmatically connected with a left edge of the second portion of the desktop such that in response to the first partial portion of the window being moved off the right edge of the first portion of the desktop, the processor can cause a corresponding portion of the duplicate to be moved onto the second portion of the desktop from the left edge of the second portion of the desktop; a top edge of the first portion of the desktop can be programmatically connected with a bottom edge of the second portion of the desktop such that in response to the first partial portion of the window being moved off the top edge of the first portion of the desktop, the processor can cause a corresponding portion of the duplicate to be moved onto the second portion of the desktop from the bottom edge of the second portion of the desktop; and a bottom edge of the first portion of the desktop can be programmatically connected with a top edge of the second portion of the desktop such that in response to the first partial portion of the window being moved off the bottom edge of the first portion of the desktop, the processor can cause a corresponding portion of the duplicate to be moved onto the second portion of the desktop from the top edge of the second portion of the desktop.

In another aspect, a method is provided that includes displaying a first portion of a desktop on a first display device, displaying a second portion of the desktop on a second display device, displaying a window on the first portion of the desktop, creating a duplicate of the window, and moving a first partial portion of the window off the first portion of the desktop such that a second partial portion of the window is displayed on the first portion of the desktop and a duplicate of the first partial portion of the window is displayed on the second portion of the desktop. The duplicate can be created prior to moving the first partial portion of the window off the first portion of the desktop, and prior to receiving an instruction to move the first partial portion of the window off the first portion of the desktop.

The method can have any number of variations. For example, the method can include receiving an instruction to move the first partial portion of the window off the first portion of the desktop. The duplicate can be created in response to receiving the instruction. For another example, the method can include displaying the duplicate on the first portion of the desktop in an invisible state. A second partial portion of the window can be displayed on the first portion of the desktop, and the first partial portion of the duplicate can be displayed on the second portion of the desktop in a visible state. The duplicate can be displayed on the first portion of the desktop in the invisible state prior to any portion of the duplicate being displayed on the second portion of the desktop.

In another aspect, a computer-readable storage medium having a program stored thereon is provided. The program when executed can cause a computer to perform a method, the method comprising displaying a first portion of a desktop on a first display device, displaying a second portion of the desktop on a second display device, displaying a window on the first portion of the desktop, creating a duplicate of the window, and moving a first partial portion of the window off the first portion of the desktop such that a second partial portion of the window is displayed on the first portion of the desktop and a duplicate of the first partial portion of the window is displayed on the second portion of the desktop.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
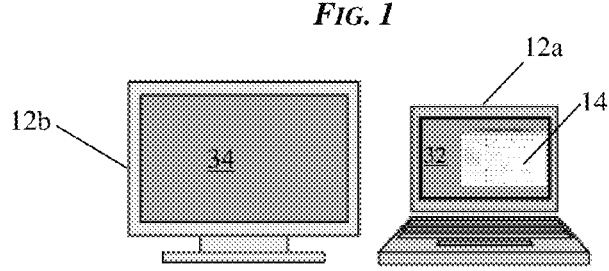
FIG. 1 is a front view of one embodiment of a computing system including a primary display and a secondary display, a window being displayed on the primary display.

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Various exemplary methods, systems, and devices are provided for emulating moving electronic windows between displays. In general, the methods, systems, and devices can allow seamless movement of electronic windows back and forth between multiple electronic displays. In one embodiment, a plurality of displays can each be configured to display a portion of a desktop, e.g., a graphical user interface (GUI) upon which objects (e.g., windows, computer icons, etc.) can be placed. A duplicate can be created of a window displayed on a first one of the displays. In response to an instruction to move the window from the first one of the displays to a second one of the displays, the duplicate can be programmatically moved on the second one of the displays in unison with movement of the window on the first one of the displays. In this way, a partial portion of the window moved off the first one of the displays can appear on the second one of the displays by displaying on the second one of the displays a partial portion of the duplicate that corresponds to the partial portion of the window that has moved off the first one of the displays. The window can therefore be seamlessly displayed to a user. User experience can thus be improved by allowing a user to visualize an entirety of a window, including during movement of the window between displays, and including a situation in which a pointer moving the window on the first one of the displays does not move off the first one of the displays. The duplicate can be displayed on the second one of the displays in a logical position relative to the first one of the displays such that a user can intuitively move the window physically toward the second one of the displays to move the window thereto. In other words, if the primary display is located physically to the right of the secondary display, a user can move a window displayed on the primary display to the left physically toward the secondary display to move the window thereto, if the primary display is located physically to the left of the secondary display, a user can move a window displayed on the primary display to the right physically toward the secondary display to move the window thereto, if the primary display is located physically above the secondary display, a user can move a window displayed on the primary display down physically toward the secondary display to move the window thereto, and if the primary display is located physically below the secondary display, a user can move a window displayed on the primary display up physically toward the secondary display to move the window thereto. Additionally, since the duplicate displayed on the second one of the displays can be moved in unison with the window displayed on the first one of the displays, user experience can be improved by allowing the user to continually and accurately adjust position of the window on the second one of the displays, including before the window has been fully moved onto the second one of the displays.

A person skilled in the art will appreciate that the devices, systems, and methods disclosed herein can be implemented using one or more computing systems. The term "computing system" as used herein refers to any of a variety of digital data processing devices, e.g., laptop or notebook computers, tablet computers, server computers, cell phones, PDAs, gaming systems, televisions, radios, portable music players, and the like. The systems and methods disclosed herein can also be implemented in part or in full using software, which can be stored as an executable program or programs on one or more non-transitory computer-readable storage mediums. The term "display" as used herein refers to any of a variety of display devices, e.g., a liquid crystal display (LCD), a light-emitting diode (LED) screen, a cathode ray tube (CRT) screen, a touchscreen, a 3D screen, and the like. Additionally, the term "display" as used herein can refer to a display that is mounted in the same chassis or package as one or more other displays in the system, as well as to a display that is physically separate from one or more other displays in the system. A computing system can thus include multiple displays in a single chassis or package, or a computing system can include at least one display in a single chassis or package having one or more additional displays removably and replaceably operatively coupled to the single chassis or package, e.g., by cord, by wire, by wireless electronic connection, etc. The term "window" as used herein refers to a visual object on a display. The visual object can have any shape, e.g., rectangular, ovular, trapezoidal, irregular, etc., and can optionally contain a user interface allowing input thereto by a user, e.g., input by keyboard, by mouse, by touch, by electronic stylus, etc. Non-limiting examples of a window include a box listing electronic file folder contents, a GUI display area for a program running on a computer (e.g., a music player, a video player, an image editor, an image viewer, a word processing program, etc.), a MICROSOFT® Windows GUI display area, and a warning pop-up box.

Elements discussed herein with reference to a computing system can generally be configured similar to like-named elements discussed herein.

Figure 2:
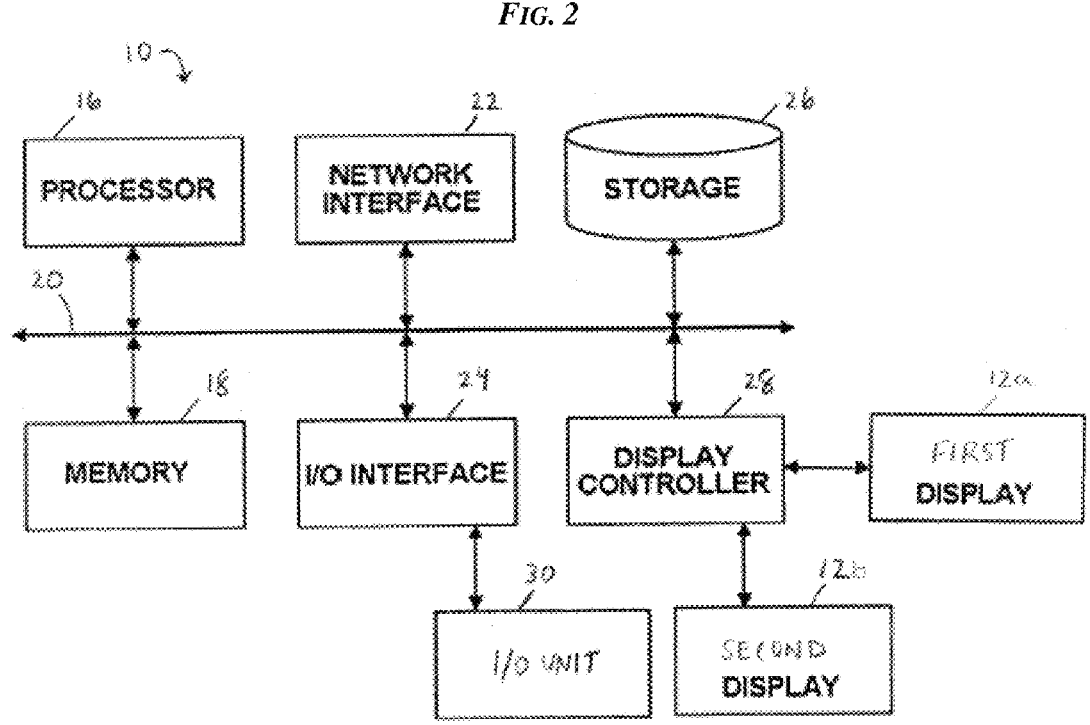
FIG. 2 is a schematic diagram of the computing system of FIG. 1.
Figure 3:
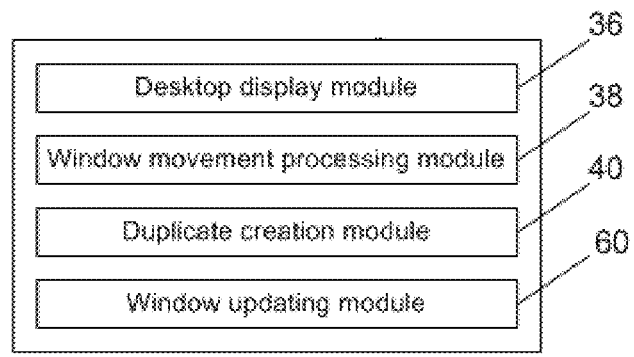
FIG. 3 is a schematic diagram of modules executable by the computing system of FIG. 2.

FIGS. 1 and 2 illustrate one exemplary embodiment of a computing system 10 configured to allow contiguous display of a window 14 between a first display 12a, also referred to herein as a "primary display," and a second display 12b, also referred to herein as a "secondary display," configured to be operatively connected to the first display 12a. A desktop display module 36 of the system 10, shown in FIG. 3, can be configured to display a GUI that includes a desktop in which various windows and other objects can be displayed. The desktop can be spread across the first display 12a and the second display 12b such that a first portion 32 of the desktop can be displayed on the first display 12a, and a second portion 34 of the desktop can be displayed on the second display 12b. The system 10 can be configured to allow the window 14 to seamlessly move between the first portion 32 of the desktop and the second portion 34 of the desktop by creating and moving a duplicate of the window 14, as discussed in further detail below.

The system 10 can include any of a variety of software and/or hardware components. In addition, although an exemplary system 10 is depicted and described herein, a person skilled in the art will appreciate that this is for sake of generality and convenience. In other embodiments, the computing system may differ in architecture and operation from that shown and described with respect to any of the illustrated embodiments. Additional information on computer systems can be found in U.S. Patent Publication No. 2009/0150779 entitled "Method And Apparatus For Displaying Help Information" filed Dec. 5, 2008, which is hereby incorporated by reference in its entirety.

As shown in FIG. 2, the illustrated system 10 includes a processor 16 which controls the operation of the system 10, for example by executing an operating system (OS), a basic input/output system (BIOS), device drivers, application programs, and so forth. The processor 16 can include any type of microprocessor or central processing unit (CPU), including programmable general-purpose or special-purpose microprocessors and/or any one of a variety of proprietary or commercially-available single or multi-processor systems. The system 10 also includes a memory 18, which can provide temporary storage for code to be executed by the processor 16 or for data that is processed by the processor 16. The memory 18 can include read-only memory (ROM), flash memory, one or more varieties of random access memory (RAM), and/or a combination of memory technologies. The various elements of the system 10 are coupled to a bus system 20. The illustrated bus system 20 is an abstraction that represents any one or more separate physical busses, communication lines/interfaces, and/or multi-drop or point-to-point connections, connected by appropriate bridges, adapters, and/or controllers.

The system 10 also includes the first display 12a, the second display 12b, a network interface 22, an input/output (I/O) interface 24, a storage device 26, and a display controller 28. The network interface 22 can enable the system 10 to communicate with remote devices, e.g., other computing devices, over a network. The I/O interface 24 can facilitate communication between one or more I/O units 30. A person skilled in the art will appreciate that the system 10 can be configured to communicate with a variety of I/O units 30. Non-limiting examples of input units include a keyboard, a touch screen, a mouse, and a pointing device. Non-limiting examples of output units includes a speaker, a printer, a scanner, a removable memory, and the various other components of the system 10. The storage device 26 can include any conventional medium for storing data in a non-volatile and/or non-transient manner. The storage device 26 can thus hold data and/or instructions in a persistent state, i.e., the value is retained despite interruption of power to the system 10. The storage device 26 can include one or more hard disk drives, flash drives, universal serial bus (USB) drives, optical drives, various media disks or cards, and/or any combination thereof, and can be directly connected to the other components of the system 10 or remotely connected thereto, such as over a network. The display controller 28 can include a video processor and a video memory, and can generate images to be displayed on the primary and secondary displays 12a, 12b in accordance with instructions received from the processor 16.

Although the primary display 12a in the illustrated embodiment includes a laptop or notebook computer, and the secondary display 12b in the illustrated embodiment includes a standalone LCD monitor, the primary and secondary displays can include other types of displays, as discussed above. The secondary display 12b in the illustrated embodiment is configured to be wirelessly operatively connected to the primary display 12a, as will be appreciated by a person skilled in the art, but primary and secondary displays can be configured to operatively connect in other ways, such as with a wired connection or a combination of wired and wireless connections, as will also be appreciated by a person skilled in the art. The primary display 12a in the illustrated embodiment has the processor 16 integrally formed therewith, e.g., disposed in a chassis or package thereof. A person skilled in the art will appreciate that the processor 16 need not be permanently disposed in the chassis or package to be integrally formed therewith, e.g., the processor 16 can be configured to be removed from the chassis or base, such by removing a motherboard including the processor 16 from the chassis or base. In other embodiments, a secondary display can have a processor integrally formed therewith and a primary display can be configured to operatively connect to the second display (e.g., the secondary display including a first tablet and the primary display including a second tablet), a processor can be integrally formed with primary and secondary displays (e.g., a notebook computer having two display screens), or primary and secondary displays (e.g., each a standalone monitor) can be configured to operatively connect to a computing system including the processor.

In the illustrated embodiment, the primary display 12a, e.g., the chassis or package thereof, also includes the memory 18, the bus system 20, the network interface 22, the I/O interface 24, the storage device 26, and the display controller 28. In other embodiments, as will be appreciated by a person skilled in the art, any one or more of the memory 18, the bus system 20, the network interface 22, the I/O interface 24, the storage device 26 can be included in a secondary display, e.g., a chassis or package thereof, or can be located external to a device's chassis or package, e.g., an external storage device plugged into a USB port, etc.

The first display 12a can be operatively coupled to the display controller 28, which can provide images to be displayed on the first display 12a. The first display 12a can be coupled to the IO interface 24 such that inputs performed on or recognized or detected by the first display 12a (e.g., touch inputs) can be received and processed by the processor 16. Software executed by the processor 16 can recognize or interpret inputs performed on or recognized or detected by the first display 12a as any of a variety of predetermined gestures, such as a tap gesture, a multi-tap gesture, a flick gesture, a drag gesture, a tap and hold gesture, a pinch gesture, a spread gesture, and so forth. Similarly, the second display 12b can be operatively coupled to the display controller 28, which can provide images to be displayed on the second display 12b, and/or the second display 12b can be coupled to the I/O interface 24 such that inputs performed on or recognized or detected by the second display 12b can be received and processed by the processor 16.

One or more software modules can be executed by the system 10 to facilitate user interaction with the system 10. The software modules can be part of a single program or one or more separate programs, and can be implemented in a variety of contexts, e.g., as part of an operating system, a device driver, a standalone application, and/or combinations thereof. A person skilled in the art will appreciate that any software functions disclosed herein as being performed by a particular software module can also be performed by any other module or combination of modules. In an exemplary embodiment, the processor 16 can be configured to execute the one or more software modules, various embodiments of modules being shown in FIG. 3.

Although two displays 12a, 12b are shown in the system 10, a computing system can include any plural number of displays configured to be operatively connected to one another such that a window can be seamlessly moved as discussed herein between the different displays. Additionally, although only one window 14 is shown displayed on the first display 12a in FIG. 1, any number of windows can be simultaneously displayed on the first display 12a. Similarly, although no windows are shown on the second display 12b in FIG. 1, any number of windows can be simultaneously displayed on the second display 12b.

The system 10 can be configured to cause movement of the window 14 from the first display 12a to the second display 12b in response to an instruction received by the system 10. The window 14 can be moved as discussed herein by the window movement processing module 38 and/or one or more other modules. The instruction can be received in any number of ways, as will be appreciated by a person skilled in the art, such as by a user manipulating the window 14 using at least one I/O unit 30, e.g., dragging and dropping the window 14. The I/O interface 24 can detect, receive, and/or interpret input provided by the user via the I/O unit(s) 30 and communicate the input to a window movement processing module 38. If the first display 12a is configured as a touch screen, the instruction can be triggered by, e.g., a user touching the window 14 on the first display 12a and moving the window 14 toward the second display 14. The display controller 28 can detect, receive, and/or interpret input provided by the user via the first display 12a and communicate the input to the window movement processing module 38.

Figure 4:
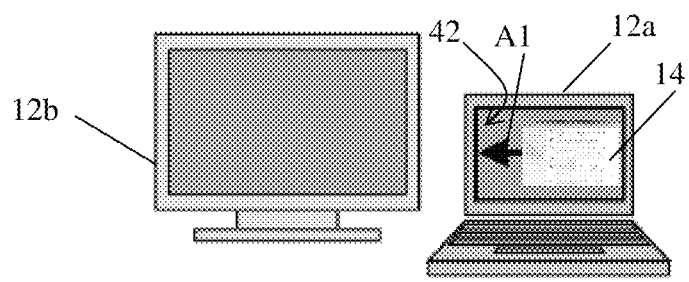
FIG. 4 is a front view of the computing system of FIG. 1, the window on the primary display being moved in a direction toward the secondary display.
Figure 5:
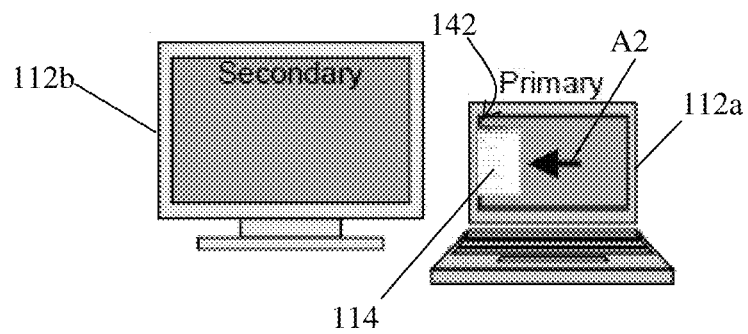
FIG. 5 is a front view of another embodiment of a computing system including a primary display and a secondary display, a window on the primary display being partially displayed thereon and being moved toward the secondary display.
Figure 6:
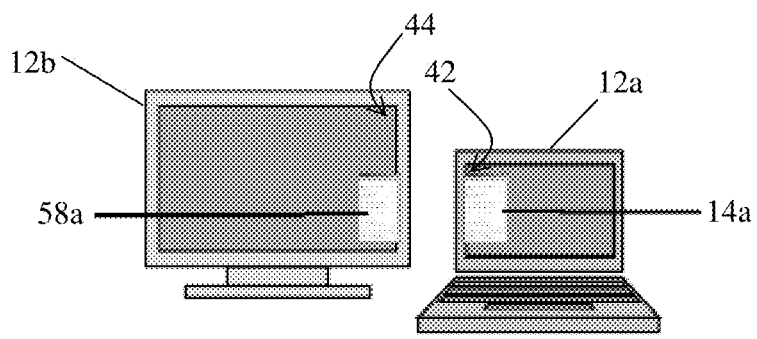
FIG. 6 is a front view of the computing system of FIG. 4, the window being partially displayed on the primary display, and a duplicate of the window being partially displayed on the secondary display.
Figure 7:
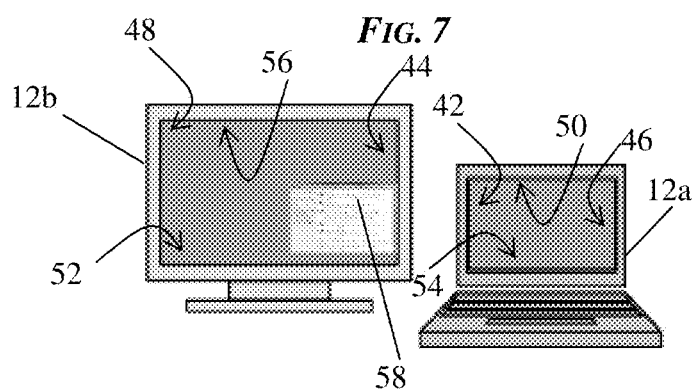
FIG. 7 is a front view of the computing system of FIG. 6, the window having been moved from the primary display to the secondary display such that the duplicate is displayed on the secondary display.

The first display 12a is physically positioned to a right of the second display 12b in the illustrated embodiment. In such a physical setup, an instruction by a user to move the window 14 from the first display 12a to the second display 12b will typically intuitively include a movement of the window 14 in a direction of an arrow A1, shown in FIG. 4, toward and off a left edge 42 of the first portion 32 of the desktop on the first display 12a, e.g., movement of the window 14 in a direction toward the second display 12b as shown by the arrow A1. The angular direction that the arrow A1 is pointing is a non-limiting example, the window 14 can be moved toward and off the left edge 42 of the first portion 32 of the desktop on the first display 12a in another angular direction toward the second display 12b. As mentioned above, a computer system traditionally considers a primary display as being physically located to the left of a secondary display such that moving a window toward and off a left edge of a desktop on the primary display would not result in the window being moved from the primary display to the secondary display. Instead, the window gets stuck at the left edge of the primary display's desktop. As shown for example in FIG. 5, a window 114 displayed on a primary display 112a moved in a horizontal, left direction of arrow A2 toward and off a left edge 142 of the desktop of the primary display 112a and toward a secondary display 112b is stuck and does not appear on the secondary display 112b. In contrast, as shown in FIGS. 4, 6, and 7, the computer system 10 can be configured to allow the window 14 to move from the primary display 12a to the secondary display 12b in response to the window 14 being moved toward and off the left edge 42 of the of the first portion 32 of the desktop on the primary display 12a. In an exemplary embodiment, the system 10 can allow such movement by having various edges of the desktop on the primary and secondary displays 12a, 12b being programmatically connected.

Generally, the primary and secondary displays 12a, 12b can be programmatically connected by mapping coordinates from an edge of one of the displays 12a, 12b to an edge of the other of the displays 12a, 12b. In other words, the edges can be virtually (e.g., electronically) connected. For non-limiting example, in a setup as the illustrated embodiment in which the primary display 12a is physically positioned to the right of the secondary display 12b though the system considers the primary display 12a as being physically located to the left of the secondary display 12b, a left most X coordinate on the primary display 12a is zero. A right most X coordinate of the secondary display is a positive number, e.g., a number equal to a number of X pixels of the primary display's monitor plus a number of X pixels of the secondary display's monitor. Thus, if a user attempts to move an object/window/pointer on the primary display 12a to the left, beyond X coordinate zero of the primary display 12a, the coordinate can be translated to the right-most X coordinate of the secondary display 12b. In this way, the edges can be programmatically connected, thereby allowing objects to pass along non-contiguous edges.

The system 10 can be configured to programmatically connect various edges of the desktop on the primary and secondary displays 12a, 12b in a variety of combinations. The various edges can be pre-programmed in the system 10 as being connected, e.g., be pre-programmed in the memory 18, as will be appreciated by a person skilled in the art. In an exemplary embodiment, as shown in FIG. 7, the left edge 42 of the first desktop portion 32 can be programmatically connected to a right edge 44 of the second desktop portion 34 such that a window can be moved contiguously between the left and right edges 42, 44, a right edge 46 of the first desktop portion 32 can be programmatically connected to a left edge 48 of the second desktop portion 34 such that a window can be moved contiguously between the left and right edges 48, 46, a top edge 50 of the first desktop portion 32 can be programmatically connected to a bottom edge 52 of the second desktop portion 34 such that a window can be moved contiguously between the top and bottom edges 50, 52, and a bottom edge 54 of the first desktop portion 32 can be programmatically connected to a top edge 56 of the second desktop portion 34 such that a window can be moved contiguously between the top and bottom edges 56, 54.

In this way, regardless of the physical locations of the primary and secondary displays 12a, 12b relative to one another, a user intuitively moving a window displayed on one of the displays 12a, 12b in a physical direction toward the other of the displays 12a, 12b can allow the window to be moved to the other of the displays 12a, 12b. The primary and secondary devices 12a, 12b can thus be initially positioned at any physical relation relative to one another with the system 10 being configured to seamlessly move windows as disclosed herein between the primary and secondary devices 12a, 12b. Additionally, the primary device 12a can be repeatedly physically arranged in a variety of different physical positions relative to the secondary device 12b, e.g., as a user determines a most convenient physical setup of the user's desk, while maintaining the capability of seamlessly moving windows as disclosed herein between the primary device 12a and the secondary device(s). Similarly, the primary device 12a can be repeatedly physically arranged in a variety of different physical positions relative to the secondary device 12b and/or one or more additional secondary devices in different physical locations, e.g., in different cities as a user travels with the primary device 12a and connects the primary device 12a to different secondary devices in the different cities, while maintaining the capability of seamlessly moving windows as disclosed herein between the primary device 12a and the secondary device(s).

For non-limiting example, the primary device 12a can be moved between different rooms in which the primary device 12a may not be in the same physical position relative to a secondary display in each room because each room can have a different setup. The primary display 12a can nevertheless be configured to seamlessly move windows to/from the different secondary displays because the processor 16 can be configured to programmatically connect multiple edges of the primary and secondary displays.

For another non-limiting example, the primary display 12a can be positioned physically below the secondary display 12b. Moving the window 14 on the primary display 12a off the top edge 50 can seamlessly move the window 14 onto the secondary display 12b from the bottom edge 52.

Figure 8:
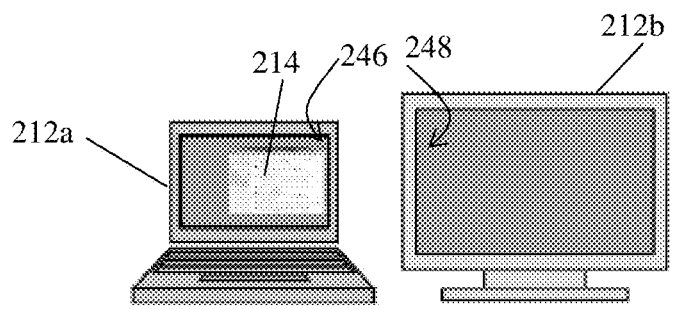
FIG. 8 is a front view of another embodiment of a computing system including a primary display and a secondary display, a window being displayed on the primary display.
Figure 9:
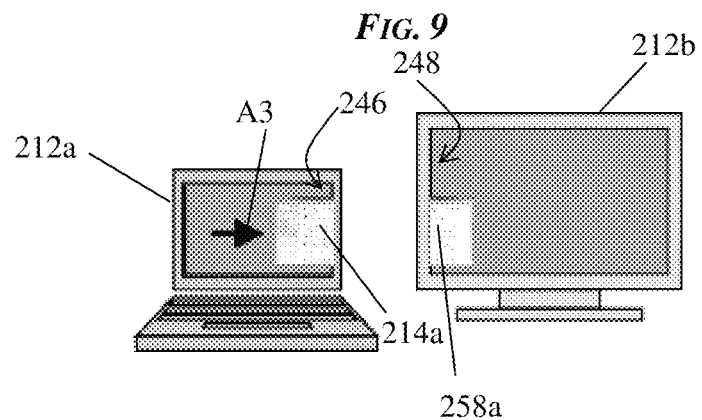
FIG. 9 is a front view of the computing system of FIG. 8, the window being partially displayed on the primary display, and a duplicate of the window being partially displayed on the secondary display.
Figure 10:
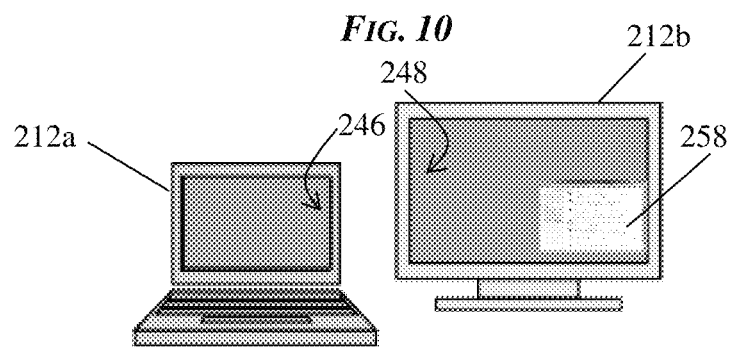
FIG. 10 is a front view of the computing system of FIG. 9, the window having been moved from the primary display to the secondary display such that the duplicate is displayed on the secondary display.

For yet another non-limiting example, shown in an embodiment of FIGS. 8-10, a primary display 212a can be positioned physically to the left of a secondary display 212b. A window 214 displayed on the primary display 212a can be moved right in a direction toward the secondary display 212b as shown by arrow A3 such that the window 214 moves off a right edge 246 of the primary display 212a and onto the secondary display 212b from a left edge 248 thereof. A duplicate 258 of the window 214 is displayed on the secondary display 212b in FIG. 10, a partial portion 258a of the duplicate 258 is displayed on the secondary display 212b in FIG. 9, and a partial portion 214a of the window 214 is displayed on the primary display 212a in FIG. 9. Creation and display of duplicates of windows, and display of partial portions of duplicates and windows, are discussed further below.

Referring again to the embodiment of FIGS. 1-4, in response to the instruction to move the window 14 from the primary display 12a to the secondary display 12b, the window 14 can be so moved by the window movement processing module 38 and/or one or more other modules. For convenience of discussion herein, the window 14 is described as being moved by the window movement processing module 38. The window movement processing module 38 can be configured to move the window 14 using a duplicate created by a duplicate creation module 40, illustrated in FIG. 3. The duplicate can be a copy of the window such that if the duplicate is displayed on the primary display 12a and/or secondary display 12b, the duplicate appears to be the same as the window 14 to a user viewing the duplicate. If a computing system includes more than two secondary displays, the duplicate creation module 40 can be configured to create one duplicate for use with all of the secondary displays, or the duplicate creation module 40 can be configured to create an individual duplicate for each the secondary displays. The duplicate can be stored in the memory 18 and/or in the storage device 26. In an exemplary embodiment, the duplicate creation module 40 can be configured to store the duplicate in the memory 18, e.g., in temporary storage.

The duplicate creation module 40 can create the duplicate in a variety of ways using software, hardware, or a combination of software and hardware. In an exemplary embodiment, the duplicate creation module 40 can use one or more application programming interfaces (APIs), such as low level graphic APIs, to gather an image of the window 14 or to gather data used to render a graphical representation of the window 14. The duplicate creation module 40 can then use the gathered image/data to render the duplicate using at least one API. As will be appreciated by a person skilled in the art, the one or more APIs can be specific to the system 10 such that different systems can have similar, yet different, API(s) provided by a graphics card vendor, provided by an operating system (OS), developed by a software implementor, etc.

The duplicate creation module 40 can be configured to create the duplicate of the window 14 prior to the window 14 being moved in response to an instruction to move the window 14 from the first display 12a to the second display 12b. In an exemplary embodiment, the duplicate creation module 40 can be configured to create the duplicate of the window 14 in response to the window 14 being displayed in a forefront of the first display 12a. The duplicate can thus be created for a window most likely to be next moved from the first display 12a to the second display 12b because it is likely the window that the user is actively viewing. As different windows move to the forefront of the first portion 32 of the desktop, the duplicate creation module 40 can be configured to create a duplicate for each of the forefront windows. Each of the duplicates can be stored (e.g., in the memory 18 and/or the storage device 26) for later use. Alternatively, only the most recently created duplicate can be stored (e.g., in the memory 18 and/or the storage device 26), which can help conserve storage space.

In another exemplary embodiment, the duplicate creation module 40 can be configured to create the duplicate of the window 14 in response to the window 14 being displayed on the first display 12a, e.g., in response to an initial instruction to display the window 14, such as by a user double clicking on an icon displayed on the desktop to open a program. A duplicate can be created for each window displayed on the first display 12a. The duplicate can thus be ready for display on the secondary display 12b either without updating the duplicate as initially created, e.g., if the window 14 includes static content (e.g., still image files, a system warning box, etc.) and/or if the duplicate creation module 40 is configured to not dynamically update contents of the duplicate until the duplicate is fully or partially displayed on the secondary display 12b, or with updating the duplicate as initially created, e.g., if the duplicate creation module is configured to dynamically update contents of the duplicate prior to the duplicate being fully or partially displayed on the secondary display 12b. In other words, the duplicate can be a live view of the window 14 such that if data changes in the window 14, data can similarly change in the duplicate, and vice versa. The duplicate can thus be a pixel-for-pixel duplicate of the window 14.

Alternatively, the duplicate can be a single static snapshot view of the window 14 such that if data changes in the window 14, data does not similarly change in the duplicate. The duplicate can thus be a pixel-for-pixel duplicate of the window 14. If the system 10 detects that a user is attempting to manipulate a static duplicate, e.g., attempting to click thereon and/or type therein using the I/O unit 30, attempts to manipulate the duplicate using touch screen functionality of the second display 12b (if the second display is configured for touch), etc., the system 10 can be configured to swap the partial window on the first display 12a and the duplicate on the second display 12b, thereby allowing the user to manipulate the window 14 on the second display 12b. The window 14 and the duplicate can be swapped between the displays 12a, 12b any number of times in response to the user attempting to manipulate the duplicate. The swap can take place as the window 14 passes from one of the displays 12a, 12b to the other of the displays 12a, 12b, for e.g., as soon as the dragging device (e.g., mouse pointer, etc.) crosses over from an edge of one of the displays 12a, 12b to the other of the displays 12a, 12b. This, in effect, better readies the window 14 for interaction by the user, since it is more likely that the user will operate on the window 14 in the display to which the window 14 was dragged instead of the display from which the window was dragged. A live duplicate that is a series of updated snapshots can be similarly swapped.

The system 10 can be configured to create a live duplicate for one window displayed on the first display 12a and to create a snapshot duplicate for each other window displayed on the first display 12a. The system 10 can therefore save processing resources and/or storage space because a snapshot duplicate can occupy less storage space and use less processing resources than a live duplicate. The system 10 can determine which of a plurality of windows on the first display 12a to create the live duplicate for based on any one or more factors, such as creating the live duplicate for a forefront window and a snapshot duplicate for every other window.

In some embodiments, the duplicate creation module 40 can be configured to create the duplicate of the window 14 in response to the window 14 being displayed on the first display 14 only if the window 14 excludes a certain type of predetermined content. The predetermined content can vary. In an exemplary embodiment, the predetermined content includes content that is continually updated by the system 10, e.g., a moving image file such as a video, a dynamically updated program (e.g., a music player, a task manager performance meter, a video player, etc.) showing continually updated information, etc. In other words, the duplicate creation module 40 can be configured to generate a duplicate of only static content in response to the window 14 being displayed on the first display 12*a*, and be configured to generate a duplicate of non-static content in response to the instruction to move the window 14 from the first display 12*a* to the second display 12*b*. In this way, the created duplicate can be ready to be displayed on the secondary display 12*b*, e.g., without the duplicate having to be updated by the duplicate creation module 40 to reflect current contents of the window. System resources can thus be conserved.

In response to the system 10 receiving an instruction to move the window 14 from the first display 12*a* to the second display 12*b*, the window movement processing module 38 can be configured to determine if a duplicate of the window 14 exists, e.g., has already been created. If the duplicate exists, the window movement processing module 38 can be configured to retrieve the duplicate from storage, e.g., from the memory 18 or the storage device 26. If the duplicate does not exist, the window movement processing module 38 can be configured to cause the duplicate creation module 40 to create a duplicate of the window 14.

Also in response to the system 10 receiving an instruction to move the window 14 from the first display 12*a* to the second display 12*b*, the window movement processing module 38 can be configured to cause the window 14 to move in the direction indicated by the instruction, e.g., in the direction of the arrow A1 in FIG. 4. As shown in FIGS. 4 and 6, in response to a partial portion (not shown in FIG. 6) of the window 14 moving off the first portion 32 of the desktop on the first display 12*a*, e.g., off the left edge 42 in the illustrated embodiment of FIG. 4, the window movement processing module 38 can cause a partial portion 58*a* of a duplicate 58, corresponding to the window 14 and created by the duplicate creation module 40 as discussed above, to be displayed on the second portion 34 of the desktop on the secondary display 12*b*. The partial portion 58*a* of the duplicate 58 displayed on the second portion 34 of the desktop on the secondary display 12*b* can correspond to the partial portion of the window 14 moved off the first portion 32 of the desktop on the first display 12*a* such that the contents of the window 14 can be fully displayed on the desktop, with a partial portion 14*a* of the window 14 on the first portion 32 of the desktop on the first display 12*a* and a remainder part, e.g., the partial portion 58*a* of the duplicate 58, on the second portion 34 of the desktop on the second display 12*b*. Although the partial portion of the window 14 that has been moved off the first portion 32 of the desktop on the first display 12*a* is technically not displayed on the second portion of the desktop 34 on the second display 12*b*, to a user viewing the displays 12*a*, 12*b*, the partial portion 58*a* of the duplicate 58 appears to be the "moved-off" portion of the window 14. The window 14 can thus appear to the user as being fully displayed on the desktop, thereby allowing the user to fully visualize information.

The window movement processing module 38 can be configured to position the partial portion 58*a* of the duplicate 58 displayed on the second portion 34 of the desktop on the secondary display 12*b* in correspondence with the window 14, as shown in FIG. 6. In other words, the window movement processing module 38 can be configured to move the partial portion 58*a* of the duplicate 58 onto the second portion 34 of the desktop on the second display 12*b* from the right edge 44 of the second portion 34 of the desktop that is programmatically connected to the left edge 42 of the first portion 32 of the desktop from which the window 14 has been moved. The partial portion 58*a* of the duplicate 58 on the second display 12*b* can be located at a vertical (top-bottom or up-down) position on the second display 12*b* corresponding to a vertical position of the partial portion 14*a* of the window 14 on the first display 12*a*, as shown in FIG. 6, which can ease user viewing of the window as a whole, even if the portions 34, 36 of the desktop are separated by a physical space as in the illustrated embodiment.

Figure 11:
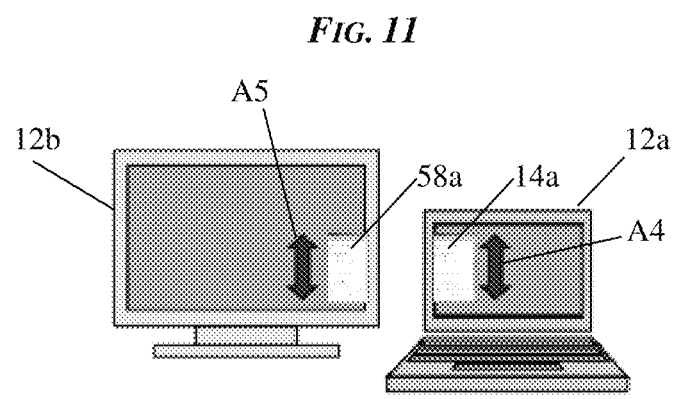
FIG. 11 is a front view of the computing system of FIG. 6, the partial window and the partial duplicate being moved in unison.

The window movement processing module 38 can be configured to move the partial portion 58*a* of the duplicate 58 on the second display 12*b* in unison with the partial portion 14*a* of the window 14 on the first display 12*a*. Thus, as the window 14 moves off the first portion 32 of the desktop, the partial portion 58*a* of the duplicate 58 on the second portion 34 of the desktop can be updated such that, to a user visualizing the displays 12*a*, 12*b*, the window 14 appears to be seamlessly moving from the first display 12*a* to the second display 12*b*. In other words, if the system 10 receives an instruction, e.g., a user instruction via the I/O unit 30, to move the partial portion 14*a* of the window 14 in a vertical direction, e.g., up and/or down, as indicated by arrow A4 shown in FIG. 11, the window movement processing module 38 can be configured to move the partial portion 58*a* of the duplicate 58 in a corresponding vertical direction as indicated by arrow A5 in FIG. 11. The arrows A4, A5 in FIG. 11 point in illustrative directions only. The partial window 14*a* and the partial duplicate 58*a* can be moved together in unison in any combination of horizontal, vertical, and diagonal directions. The window movement processing module 38 can be configured to move the partial portion 58*a* of the duplicate 58 on the second display 12*b* in unison in a variety of ways, such as by continually capturing, e.g., using at least one API, a position or coordinates of the window 14 (or partial portion thereof) on the first display 12*a* and/or a position or coordinate of a pointer manipulating the window 14, and moving the duplicate 58 (or partial portion thereof) by a same position or coordinate translation on the second display 12*b*. A person skilled in the art will appreciate that although movement of the window 14 from the first display 12*a* to the second display 12*b* may visually appear to be seamless, a processing delay that is substantially visually imperceptible may exist in moving the window 14 off the first display 12*a*, in updating the partial portion 14*a* of the window 14 on the display, and in updating the partial portion 58*a* of the duplicate 58 on the second display 12*b*.

Once the window 14 has been fully moved off the first portion 32 of the desktop on the first display, as shown in FIG. 7, the duplicate 58 can be fully displayed on the secondary device 12*b*. To a user visually observing the duplicate 58 on the second display 12*b*, the duplicate 58 appears to be the window 14 previously visible on the first display 12*a*. The duplicate 58 can be moved around the second display 12*b* by a user and/or otherwise manipulated on the second display 12*b* by a user, e.g., allow data to be input thereto by one or more I/O unit(s) 30, etc., similar to the movement and manipulation provided by the system 10 for the window 14 displayed on the first display 12*a*. The duplicate 58 in the illustrated embodiment cannot be operated on (e.g., allow data to be input, clicks to be registered, etc.) since it is a pixel-for-pixel image/copy of the original window 14, but the duplicate 58 can be acted upon by being swapped, as discussed above. The window 14 can be updated in the background by a window updating module 60 such that in response to an instruction to move the duplicate 58 from the secondary display 12*b* to the primary display 12*a*, the window 14 can be ready for a partial portion and/or a full portion thereof to be displayed on the first display 12*a*. Alternatively, the window updating module 60 can be configured to update the window 14 for at least partial display on the first display 12a in response to an instruction to move the duplicate 58 from the secondary display 12b to the primary display 12a.

In another exemplary embodiment, once the window 14 has been fully moved off the first portion 32 of the desktop on the first display 12a, the window 14 can be fully displayed on the second display 12b, and the duplicate 58 can be removed from the second display 12b and can be disposed of, e.g., deleted or marked for deletion from its storage location in the memory 18 and/or the storage device 26. In this way, the system 10 need not store and/or dynamically update two windows, e.g., the window 14 and the duplicate 58, instead of one window, e.g., the window 14, which can conserve processing resources. The duplicate 58 can, however, be maintained in its storage location, with or without being dynamically updated by the processor 16, which can facilitate movement of the window 14 from the second display 12b to the first display 12a in the event an instruction is received for such movement. If the duplicate 58 is maintained in its storage location, the duplicate 58 can be subsequently used in moving the window 14 from the second display 12b to the first display 12a similar to that discussed herein in moving a window from a first display to a second display.

Whether the system 10 is configured to display the duplicate 58 or the window 14 on the second display 12b, the window 14 and the duplicate 58 can be moved any number of times between the primary and secondary displays 12a, 12b. The system 10 may thus be configured to create multiple duplicates of the window 14, e.g., when the system 10 is configured to dispose of a duplicate after the window 14 has been fully moved onto the one of the first and second displays 12a, 12b to which it is being moved and the window 14 is subsequently moved again between the first and second displays 12a, 12b.

The duplicate 58 created by the duplicate creation module 40 and stored in the memory 18 and/or the storage device 26 can optionally be displayed in an invisible state on the first display 12a or on the second display 12b. Displaying the duplicate 58 in the invisible state can speed up display of the duplicate 58 on the second display 12b. The window movement processing module 38 can be configured to cause the invisibly displayed duplicate to be visibly displayed on the second display 12b partially, e.g., as in FIG. 6, and/or fully, e.g., as in FIG. 7, in connection with movement of the window 14 from the first display 12a to the second display 12b. In an exemplary embodiment, the duplicate creation module 40 can cause the duplicate 58 to be displayed in the invisible state on the first display 12a or on the second display 12b prior to any portion of the window 14 being moved off the first portion 32 of the desktop and prior to the system 10 receiving an instruction to move the window 14 from the first display 12a to the second display 12b.

If the system 10 is configured to maintain the duplicate 58 in its storage location once the window 14 has been fully moved off the first portion 32 of the desktop on the first display 12a and remove the duplicate 58 from the second display 12b, the system 10 can be configured to display the duplicate 58 on the first portion 32 of the desktop on the first display 12a, or on the second display 12b, while the window 14 is displayed on the second display 12b. Invisibly displaying the duplicate 58 in this way can facilitate movement of the window 14 from the second display 12b to the first display 12a if an instruction to do so is received.

Figure 12:
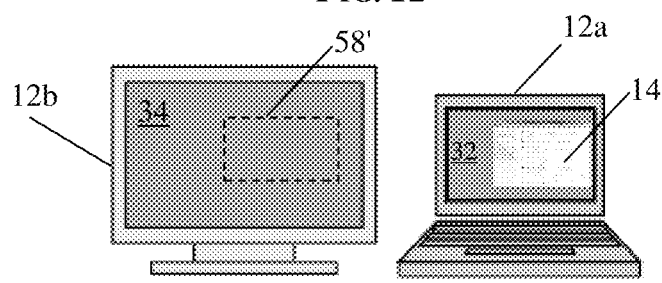
FIG. 12 is a front view of another embodiment of a computing system including a primary display and a secondary display, a window being displayed on the primary display, and a duplicate of the window being displayed on the secondary display in an invisible state.

FIG. 12 illustrates an embodiment in which a duplicate 58' created by the duplicate creation module 40 is invisibly displayed on a different display than the window 14, on the second portion 34 of the desktop on the second display 12b prior to the window 14 having any portion thereof be moved off the first portion 32 of the desktop of the first display 12a. The invisible duplicate 58' can be positioned anywhere on the second portion 34 of the desktop. As mentioned above, the window movement processing module 38 can be configured to cause the invisibly displayed duplicate 58' to be visibly displayed on the second display 12b partially, e.g., as in FIG. 6, and/or fully, e.g., as in FIG. 7, in connection with movement of the window 14 from the first display 12a to the second display 12b.

Figure 13:
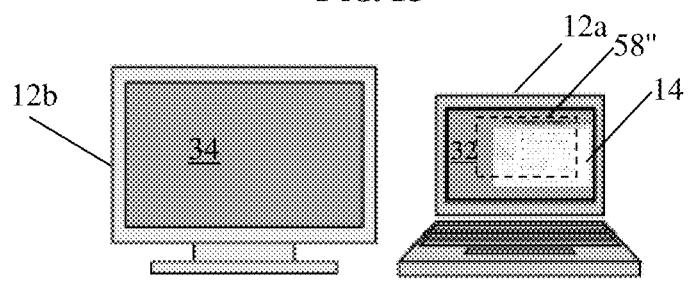
FIG. 13 is a front view of another embodiment of a computing system including a primary display and a secondary display, a window being displayed on the primary display, and a duplicate of the window being displayed on the primary display in an invisible state.

FIG. 13 illustrates an embodiment in which a duplicate 58" created by the duplicate creation module 40 is invisibly displayed on a same display as the window 14, on the first portion 32 of the desktop on the first display 12a prior to the window 14 having any portion thereof being moved off the first portion 32 of the desktop of the first display 12a. The invisible duplicate 58" can be positioned anywhere on the first portion 32 of the desktop. As mentioned above, the window movement processing module 38 can be configured to cause the invisibly displayed duplicate 58" to be visibly displayed on the second display 12b partially, e.g., as in FIG. 6, and/or fully, e.g., as in FIG. 7, in connection with movement of the window 14 from the first display 12a to the second display 12b.

In some embodiments, the system 10 can be configured to display a representative duplicate of the window 14 on the second display 12b during movement of the window 14 from the first display 12a to the second display 12b until the window 14 is fully moved. Once the window 14 has been fully moved off the first display 12a, the representative duplicate of the window 14 can be visually removed from the second display 12b, e.g., deleted therefrom or displayed thereon in an invisible state, and the window 14 (or the duplicate 58, if created) can be fully displayed on the second display 12b. Displaying a representative duplicate of the window 14 can conserve processing resources and/or allow faster movement of the window 14 to the second display 12b because the representative duplicate of the window 14 can include less functionality than the window 14, e.g., can omit some or all data visible in the window 14. If the system 10 is configured to display the representative duplicate of the window 14, the duplicate creation module 40 can be configured to create the representative duplicate of the window 14 instead of the duplicate 58.

The system 10 can be configured to create a duplicate for one window displayed on the first display 12a and to create a representative duplicate for each other window displayed on the first display 12a. The system 10 can therefore save processing resources and/or storage space because a representative duplicate can occupy less storage space and use less processing resources than a duplicate. The system 10 can determine which of a plurality of windows on the first display 12a to create the duplicate for based on any one or more factors, such as creating the duplicate for a forefront window and a representative duplicate for every other window.

Figure 14:
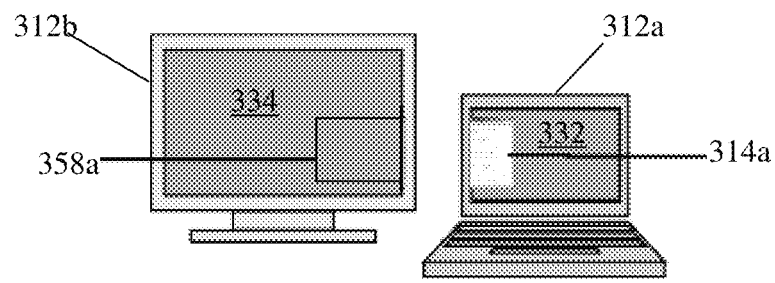
FIG. 14 is a front view of another embodiment of a computing system including a primary display and a secondary display, a window being partially displayed on the primary display, and a representative duplicate of the window being partially displayed on the secondary display.

The representative duplicate of a window can have a variety of configurations. In an exemplary embodiment, a representative duplicate of a window can include a solid or at least partially filled shape having same dimensions as the window. In another exemplary embodiment, illustrated in FIG. 14, a representative duplicate of a window can include an outline or wireframe having same dimensions as the window. FIG. 14 illustrates a partial portion 358a of the outline or wireframe displayed on a second portion 334 of a desktop on a second display 312b corresponding to a partial portion of the window already having been moved off a first portion 332 of the desktop on a first display 312a, which has a remaining portion 314a of the window displayed thereon. As mentioned above, once the window has been fully moved off the first display 312a, the representative duplicate of the window can be visually removed from the first display 312a, and the window (or a duplicate, if created) can be fully displayed on the second display 312b.

Figure 15:
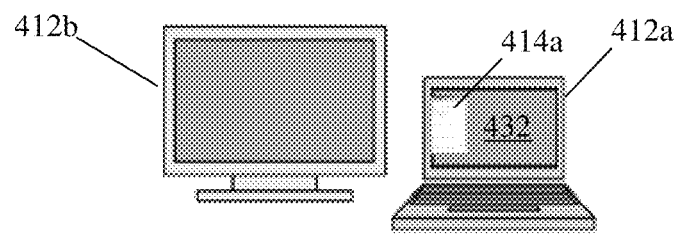
FIG. 15 is a front view of another embodiment of a computing system including a primary display and a secondary display, a window being partially displayed on the primary display.

In some embodiments, a computing system can be configured to "jump" a window from a first display to a second display by not showing the window on the second display until a pointer moving the window on the first display has moved from the first display to the second display, e.g., without displaying a partial portion of the duplicate on the second display, which can accommodate for limited processing capability and/or be faster than displaying a partial portion of the duplicate on the second display. The computing system can thus be configured to not create a duplicate of the window and be configured to display the window on the second display once the pointer moving the window on the first display has moved from the first display to the second display. FIG. 15 illustrates am embodiment of a first display 412a having a partial portion 414a of a window displayed on a first portion 432 of a desktop thereon, the window being moved to a second display 412b. Once a pointer moving the window has moved from the first display 412a to the second display 412b, the window can be fully or partially displayed on the second display 412b so as to "jump" thereon.

The devices, systems, and methods disclosed herein are not limited to manipulating windows, but rather can be used to manipulate any of a variety of user interface objects, such as text, icons, controls, etc.

Although the invention has been described by reference to specific embodiments, a person skilled in the art will understand that numerous changes may be made within the spirit and scope of the inventive concepts described. A person skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A system, comprising:
   a first display device configured to display a first portion of a desktop;
   a second display device configured to display a second portion of the desktop;
   a computer processor configured to
      operatively connect to the first display device and the second display device,
      create a duplicate of a window displayed on the first portion of the desktop,
      display on the second portion of the desktop a partial portion of the duplicate that corresponds to a partial portion of the window displayed on the first portion of the desktop that has been moved off the first portion of the desktop in response to an instruction to move the window from the first portion of the desktop to the second portion of the desktop,
      create the duplicate in response to the instruction to move the window from the first portion of the desktop to the second portion of the desktop, and
      move the duplicate or a portion thereof displayed on the second portion of the desktop in unison with movement of the window or a portion thereof displayed on the first portion of the desktop.

2. The system of claim 1, wherein the processor is configured to create the duplicate in response to the window being displayed on the first portion of the desktop prior to the instruction to move the window from the first portion of the desktop to the second portion of the desktop.

3. The system of claim 1, wherein the processor is configured to create the duplicate in response to the window being displayed on the first portion of the desktop in a forefront thereof.

4. The system of claim 1, wherein the processor is configured to display on the second portion of the desktop an entirety of the duplicate in response to an entirety of the window displayed on the first portion of the desktop having been moved off the first portion of the desktop in response to the instruction to move the window from the first portion of the desktop to the second portion of the desktop.

5. The system of claim 1, wherein, in response to a second instruction to move the duplicate displayed on the second portion of the desktop from the second portion of the desktop to the first portion of the desktop, the processor is configured to display on the first portion of the desktop a partial portion of the window that corresponds to a partial portion of the duplicate displayed on the second portion of the desktop that has been moved off the second portion of the desktop.

6. The system of claim 1, wherein at least two of
   a left edge of the first portion of the desktop is programmatically connected with a right edge of the second portion of the desktop such that in response to the first partial portion of the window being moved off the left edge of the first portion of the desktop, the processor causes a corresponding portion of the duplicate to be moved onto the second portion of the desktop from the right edge of the second portion of the desktop;
   a right edge of the first portion of the desktop is programmatically connected with a left edge of the second portion of the desktop such that in response to the first partial portion of the window being moved off the right edge of the first portion of the desktop, the processor causes a corresponding portion of the duplicate to be moved onto the second portion of the desktop from the left edge of the second portion of the desktop;
   a top edge of the first portion of the desktop is programmatically connected with a bottom edge of the second portion of the desktop such that in response to the first partial portion of the window being moved off the top edge of the first portion of the desktop, the processor causes a corresponding portion of the duplicate to be moved onto the second portion of the desktop from the bottom edge of the second portion of the desktop; and
   a bottom edge of the first portion of the desktop is programmatically connected with a top edge of the second portion of the desktop such that in response to the first partial portion of the window being moved off the bottom edge of the first portion of the desktop, the processor causes a corresponding portion of the duplicate to be moved onto the second portion of the desktop from the top edge of the second portion of the desktop.

7. The system of claim 1, wherein, in response to a pointer moving the window from the first portion of the desktop to the second portion of the desktop crossing over to the second portion of the desktop, the processor is configured to
   cause a second partial portion of the duplicate to be displayed on the first portion of the desktop;
   cause a second partial portion of the window to be displayed on the second portion of the desktop; and
   in response to an instruction to manipulate data in the second partial portion of the duplicate displayed on the first portion of the desktop, cause the partial portion of the window to be displayed on the first portion of the desktop and cause the partial portion of the duplicate to be displayed on the second portion of the desktop to allow manipulation of the window on the first portion of the desktop.

8. The system of claim 1, wherein the processor is configured to cause the duplicate to exist on the first portion of the desktop in an invisible state.

9. The system of claim 8, wherein the processor is configured to cause the duplicate to exist on the first portion of the desktop in the invisible state prior to any portion of the duplicate being displayed on the second portion of the desktop.

10. The system of claim 8, wherein the processor is configured to make the duplicate visible on the first portion of the desktop and display the partial portion of the duplicate on the second portion of the desktop in response to the instruction to move the window from the first portion of the desktop to the second portion of the desktop.

11. The system of claim 1, wherein the duplicate comprises at least one of an outline of the window and a snapshot view of contents of the window.

12. A method, comprising:
    displaying a first portion of a desktop on a first display device;
    displaying a second portion of the desktop on a second display device;
    displaying a window on the first portion of the desktop;
    creating a duplicate of the window displayed on the first portion of the desktop;
    displaying on the second portion of the desktop a partial portion of the duplicate that corresponds to a partial portion of the window displayed on the first portion of the desktop that has been moved off the first portion of the desktop in response to an instruction to move the window from the first portion of the desktop to the second portion of the desktop;
    creating the duplicate in response to an instruction to move the window from the first portion of the desktop to the second portion of the desktop; and
    moving the duplicate or a portion thereof displayed on the second portion of the desktop in unison with movement of the window or a portion thereof displayed on the first portion of the desktop.

13. The method of claim 12, wherein the duplicate is created prior to moving the first partial portion of the window off the first portion of the desktop, and prior to receiving an instruction to move the first partial portion of the window off the first portion of the desktop.

14. The method of claim 12, further comprising causing the duplicate to exist on the first portion of the desktop in an invisible state.

15. The method of claim 14, further comprising displaying on the first portion of the desktop a second partial portion of the window and causing the first partial portion of the duplicate to exist in a visible state on the second portion of the desktop.

16. The method of claim 14, wherein the duplicate exists on the first portion of the desktop in the invisible state prior to any portion of the duplicate being displayed on the second portion of the desktop.

17. A non-transitory computer-readable storage medium having a program stored thereon, the program when executed causing a computer to perform a method, the method comprising:
    displaying a first portion of a desktop on a first display device;
    displaying a second portion of the desktop on a second display device;
    displaying a window on the first portion of the desktop;
    creating a duplicate of the window displayed on the first portion of the desktop;
    displaying on the second portion of the desktop a partial portion of the duplicate that corresponds to a partial portion of the window displayed on the first portion of the desktop that has been moved off the first portion of the desktop in response to an instruction to move the window from the first portion of the desktop to the second portion of the desktop;
    creating the duplicate in response to an instruction to move the window from the first portion of the desktop to the second portion of the desktop; and
    moving the duplicate or a portion thereof displayed on the second portion of the desktop in unison with movement of the window or a portion thereof displayed on the first portion of the desktop.

* * * * *